United States Patent [19]
Dymond et al.

[11] Patent Number: 4,575,773
[45] Date of Patent: Mar. 11, 1986

[54] METHOD AND APPARATUS FOR SELECTIVELY RECORDING INSTRUMENT QUALITY DATA OR COMPOSITE INSTRUMENT QUALITY DATA AND VIDEO SIGNALS ON A COMMERCIAL UNMODIFIED VIDEO TAPE RECORDER

[76] Inventors: Anthony M. Dymond, 1513 Pamela Crest Dr., Redlands, Calif. 92373; Thomas B. Fryer, 14029 Saratoga Hills Rd., Saratoga, Calif. 95070

[21] Appl. No.: 439,275

[22] Filed: Nov. 4, 1982

[51] Int. Cl.⁴ .............................................. G11B 5/00
[52] U.S. Cl. ..................................... 360/32; 358/335; 360/8; 360/48
[58] Field of Search ...................... 358/335; 360/8, 39, 360/32, 48, 49, 72.2, 53, 9, 35, 37.1; 369/59, 60

[56] References Cited

U.S. PATENT DOCUMENTS

4,138,694  2/1979  Doi et al. ............................ 360/8 X

OTHER PUBLICATIONS

Corvus Systems Brochure-Corvus "Mirror", Aug. 1980.

*Primary Examiner*—Robert L. Richardson
*Attorney, Agent, or Firm*—John J. Leavitt

[57] ABSTRACT

Presented is a method and apparatus for recording or "writing" an analog signal onto commercially available video recording tape through use of a conventional unmodified video tape recording device utilizing the standard video composite wave form conventionally used in conjunction with the recordation of video signals.

3 Claims, 21 Drawing Figures

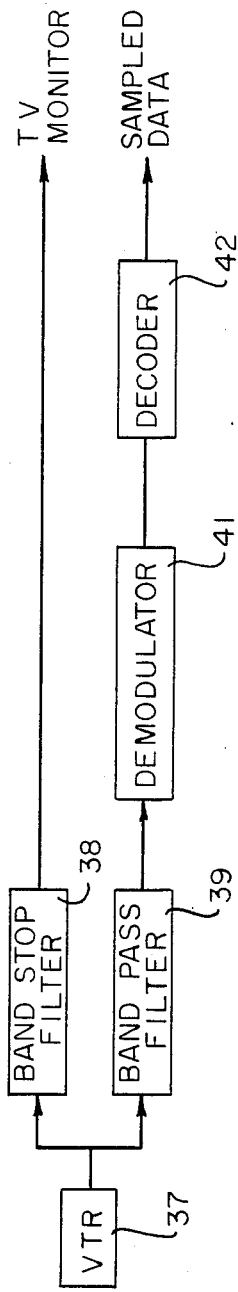
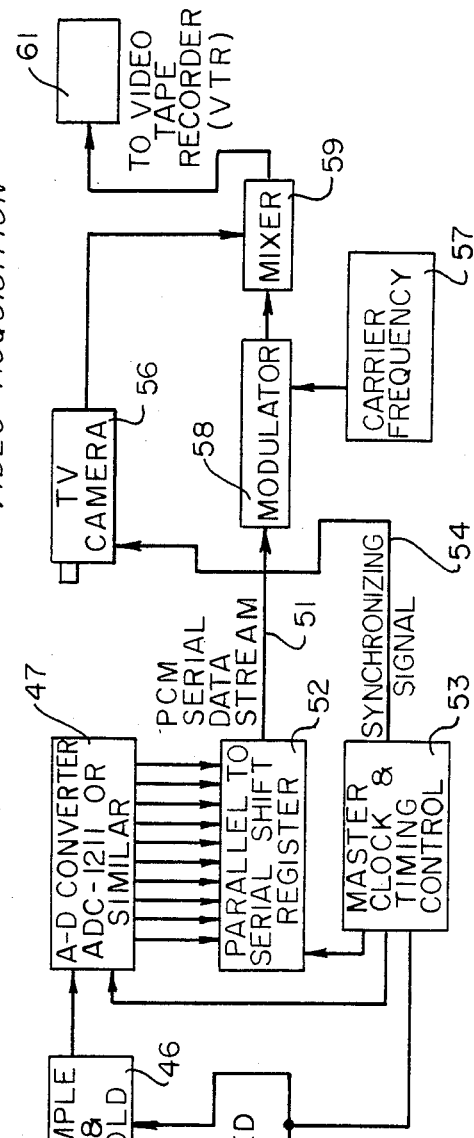
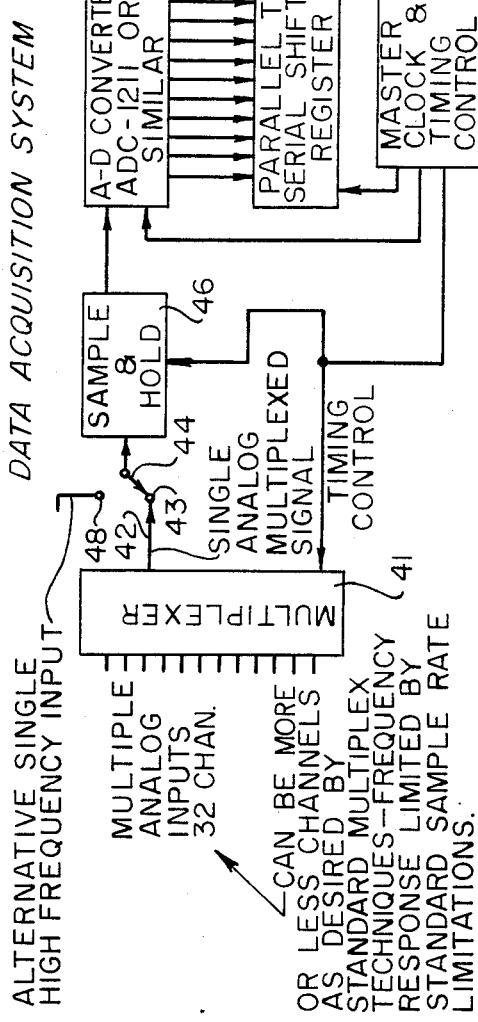
FIG. 9
FIG. 10

SYSTEM BLOCK DIAGRAM

METHOD AND APPARATUS FOR SELECTIVELY RECORDING INSTRUMENT QUALITY DATA OR COMPOSITE INSTRUMENT QUALITY DATA AND VIDEO SIGNALS ON A COMMERCIAL UNMODIFIED VIDEO TAPE RECORDER

BACKGROUND OF THE INVENTION

1. Field of the Invention

This invention relates to methods and apparatus for recording signals on video tape, and particularly to a method and apparatus for recording instrument quality data on a conventional unmodified video tape recorder while utilizing the conventional video composite waveform.

2. Description of the Prior Art

We are not aware of any patents, domestic or foreign that address the problem of recording instrument quality data on commercially available conventional video tape using a conventional unmodified video tape recorder while utilizing the conventional video composite waveform. In like manner, we are not aware of any periodical literature that addresses this problem or proposes a solution to the problem.

To understand the problem, and the solution, it is well to review briefly the cooperative relationship which exists between conventional unmodified video tape recordings and video or television (TV) sets or TV monitors on which the images recorded by the video tape recorder are displayed. It is important to keep in mind that essentially all television sets manufactured in the United States or imported into the United States from foreign manufacturers conform to the same conventional video composite waveform standard. Video composite waveform may be defined as analog signals (normally video signals) recorded on video tape in a series of transversely extending tracks spaced longitudinally from one another, thus introducing a series of discontinuities, requiring the synchronization of the recorded analog signals by use of vertical and horizontal synchronization pulses also recorded on the video tape, but recorded thereon in tracks that extend longitudinally of the video tape. Conformation of all TV sets and video tape recorders to this conventional video composite waveform standard is important because it forms the basis for compatibility among the many different brands of television sets and video tape recorders.

Heretofore, audio or other analog or digital signals have been recorded on magnetic tape by conventional magnetic tape recorders only on elongated tracks running parallel to the longitudinal dimension of the recording tape. So far as we know, data signals, either analog or digital, have never been recorded on conventional video tape utilizing a conventional unmodified and commercially available video tape recorder which utilizes the video composite waveform standard so that such data signals are recorded on the video tape in discontinuous tracks that extend transversely across the video tape.

Accordingly, one of the important objects of this invention is the provision of a method of recording instrument quality data signals on a recording medium including magnetic material in a pattern compatible to the conventional video composite waveform standard.

Another object of the invention is the provision of a method of recording instrument quality data on video tape through use of a conventional unmodified video tape recorder the operation of which adheres to the conventional video composite waveform standard.

Still another object of the invention is the provision of a method of recording instrument quality data signals on video tape directly or indirectly using a modulated carrier wave.

A still further object of the invention is the provision of apparatus for selectively recording instrument quality data, or composite instrument quality data and video signals on a commercial unmodified video tape recorder.

The invention possesses other objects and features of advantage, some of which, with the foregoing, will be apparent from the following description and the drawings. It is to be understood however that the invention is not limited to the particular method or means illustrated and described, since it may be embodied in different forms within the scope of the appended claims.

SUMMARY OF THE INVENTION

In terms of broad inclusion, the method and apparatus of the invention enables the recordation on a video tape, of an analog signal representative of instrument quality data other than video signals, in a pattern compatible with the conventional video composite waveform standard, whereby the signals may be recorded on a conventional unmodified video tape recorder.

In one aspect of the method, the analog signal is sampled at a predetermined rate, the samples are digitized, giving effect to the vertical and horizontal sync pulses of a video composite waveform standard, and applied directly to the recording medium.

In another aspect of the method, the digitized signal samples are utilized to modulate a carrier frequency, and this modulated signal is recorded on an unmodified video tape recorder.

In the aspect of apparatus, the invention in broad scope includes apparatus, cooperatively related to a conventional video camera adapted to view a scene and record the scene on the video tape of a conventional unmodified video tape recorder utilizing the conventional video composite waveform standard, which will enable the recordation on the same video tape, with the same unmodified video recorder, of instrument quality data from any selected source.

A still further object of the invention is the provision of apparatus operative to enable the utilization of such recorded instrument quality data recorded on a conventional video tape utilizing the video composite waveform standard.

BRIEF DESCRIPTION OF THE DRAWINGS

FIG. 9 is a diagramatic view in block diagram form of a system for playing back a co-recorded video tape.

FIG. 10 is a diagrammatic view in block diagram form of a data and video signal aquisition and recording system according to the present invention.

DESCRIPTION OF THE PREFERRED EMBODIMENT

In terms of greater detail, it will be helpful for a clear understanding of the present invention to review briefly some of the technology involved with the invention.

Television pictures are displayed on a television (TV) monitor in a raster scan format with the scanning electron beam starting at the top of the picture tube and completing a fixed vertical series of equally spaced horizontal sweeps down to the bottom of the picture tube. During this series of horizontal sweeps, the image on the screen is formed by controlling the intensity of the electron beam, which determines the light intensity on the picture tube being scanned at that particular instant. The synchronization signals which start the electron beam at the top of the picture tube (vertical sync) and the synchronization signals which start each horizontal sweep (horizontal sync) are encoded along with the beam intensity information as part of a video composite waveform standard. This waveform must meet a number of well known standards in order to be compatible between various commercial video devices such as TV cameras, video tape recorders (VTR), and TV monitors.

In a raster scan system, there is very little flexibility in positioning the scanning electron beam. The basic scheme is to synchronize the scan in order to know the position of the electron beam, and then control the beam intensity to form an image. This is in marked contrast to an X-Y oscilloscope display where the electron beam position is controlled entirely by externally applied X and Y positioning signals.

Video tape recorders (VTR) to record TV pictures are in common use today in both commercial and home applications. Video tape recorders are designed to meet the recording requirements of the video composite waveform standard. They must lock to and retain information about vertical and horizontal syncs. They must have a high signal bandwidth to accommodate the rapid electron beam intensity changes required to create a TV picture.

Conventional unmodified VTR's record synchronizing information in a sync track which runs lengthwise in the same direction as the tape. However, it is not possible to record the video (picture) information in this way because of the high signal bandwidth needed to create a TV picture. In any tape recording system, the bandwidth is limited by the size of the recording and playback heads, and how fast the tape passes over these heads. In practice, the speed of tape movement is the major controlling factor. For a tape recorder to record video bandwidth data on a longitudinal track over fixed heads, the tape would have to move at high speed. This would consume large amounts of tape and would be generally unacceptable.

Figure 1:
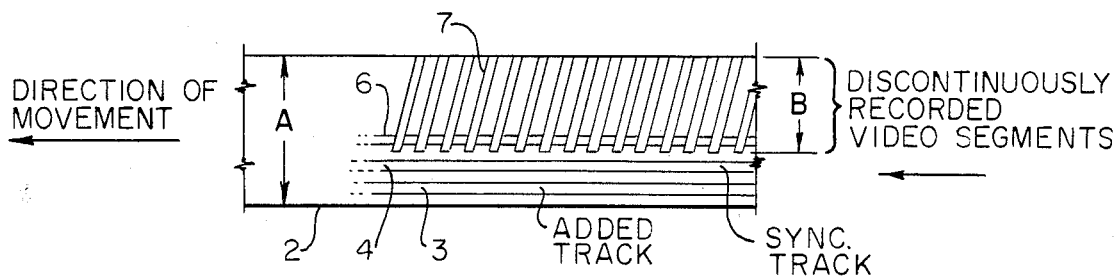
FIG. 1 is a fragmentary elevational view of a segment of video tape illustrating schematically the manner in which video signals are recorded on the tape in transversely extending longitudinally spaced tracks, while the synchronization pulse track and parallel audio tracks are formed on the tape in a longitudinal direction.

VTR's solve this problem by using a rotating head which writes video information on the tape at an angle to the direction of tape travel. Stated another way, video information is written transversely across the width of the tape. The speed of the rotating head traveling over the tape is quite high, thus providing the necessary bandwidth. Since the rotating head is recording transverse "slices" or "tracks" on the tape, the longitudinal speed of tape movement is largely a matter of determining how tightly these slices or tracks can be packed or spaced. Since this video head moves at an angle to the tape, it cannot provide a continuous recording since at best it can only go from one longitudinal side edge of the tape to the other. Actually, as can be seen in FIG. 1, the head cannot be allowed to record across the full tape width because some space adjacent one edge must be left for the longitudinally recorded sync and audio tracks. Referring to FIG. 1, the segment of video tape is designated generally by the numeral 2, possessing an overall width A of say approximately 19 mm. This width is divided into an effective video track B and two or more audio tracks 3 and 4 which extend parallel to each other longitudinally of the tape. An address track 6 is also provided extending longitudinally of the tape to provide a track on which the time code or sync pulse signals are recorded. It is important to note that the recording of video information or signals is effected on the width B of the tape on tracks 7 that extend transversely across the tape at an angle. The recording tracks are thus discontinuous in that a small space is created between adjacent tracks.

This discontinuous recording is acceptable in a raster scan system because these systems are themselves essentially discontinuous in the sense that no video information is required during intervals when sync pulses are repositioning the scanning electron beam to the top of the picture tube for the start of a new picture or to the left side of the screen for the start of a new horizontal scan line. The VTR synchronizes itself to the video composite waveform standard so that the discontinuities in the recorded video signal match the periods when the electron beam is being repositioned in relation to the picture tube and doesn't need any video signal.

The VTR can be contrasted to an audio or instrumentation tape recorder where one or more fixed heads record continuous longitudinal signals on the tape (as the VTR's sync and audio are also recorded). The advantage of these fixed head recorders is in providing continuous recordings, which is common for most audio and scientific applications. Their disadvantage is in limited bandwidth at reasonable recording speeds.

The advantage of VTR's is their high bandwidth which allows recording high frequency signals. Their disadvantage is the discontinuous nature of the recording.

Discontinuous signals are not, however, inherently disadvantageous for conveying data. Digital circuit theory specifically deals with discrete and discontinuous data, and is in common use today. Digital circuitry deals with continuous analog signals by periodically sampling the analog signal. The sampling must be sufficiently frequent to preserve the shape of the analog signal. The theories for sampling rates are widely known and in common use and need not be reiterated here.

Conversion of analog data to digital data involves periodic sampling. Writing high frequency video data onto a VTR tape involves periodically writing video data, for instance, on the longitudinally spaced tracks 7 in the width B of the tape segment shown in FIG. 1. An analog signal containing data other than video data can therefore be written onto video tape if it is sampled and the samples synchronized with the video "write" periods or intervals defined by the sync pulses.

FIG. 1 illustrates the major features of the video composite waveform standard. There are some differences between different video systems, such as broadcast quality cameras and simple industrial cameras, and systems which include color. These differences are not important to the basic premise presented by this invention for recording sampled analog data in the video data intervals. The major features of the video composite waveform standard shown in FIG. 1, including vertical syncs, horizontal syncs, and video data, apply to all video systems.

There are two major aspects to recording continuous analog data in the discrete recording intervals available for video data. The first of these is synchronizing the sampled data with the TV syncs, and the second is the method of recording the synchronized and sampled data during the appropriate discrete recording intervals.

A. Synchronization of Data with TV Composite Waveform

There is little flexibility in the timing of the TV composite waveform standard if this waveform is to remain compatible with commercial standard video equipment. Therefore, the data samples obtained from the continuous analog data signal must be synchronized with the vertical and horizontal pulses so that the information represented by the data samples can be written in the video data intervals as they occur.

Figure 2:
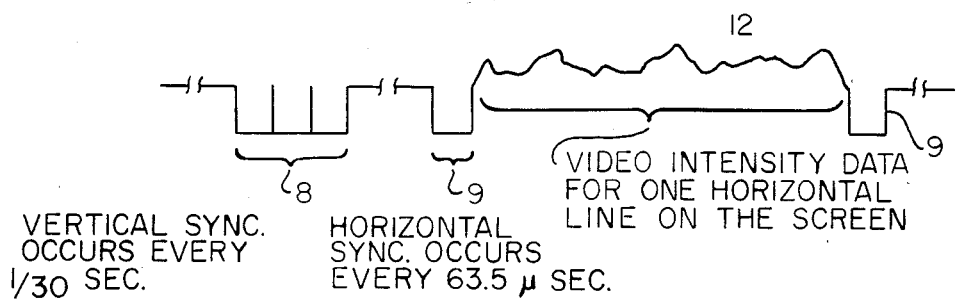
FIG. 2 is a schematic view of a generalized video composite signal illustrating its composite nature which includes vertical sync pulses which occur thirty times a second, and horizontal sync pulses which occur 15,750 times per second.

We have found that the simplest and best way to do this is to control the sampling procedure directly from the TV sync pulses. FIG. 2 shows diagrammetically how this is accomplished. If the data sampling and tape writing are synchronized, each data sample can be immediately written onto the VTR tape in the video data intervals. Referring to FIG. 2, the pulses designated by the numeral 8 represent vertical sync pulses and occur thirty times a second. Stated another way, vertical sync occurs every 1/30th of a second. Horizontal sync, represented by the pulse 9 in FIG. 2, occurs 15,750 times per second or every 63.5 μ/sec. Thus, the irregular line 12 represents video intensity data for one horizontal line on the TV screen.

Figure 3:
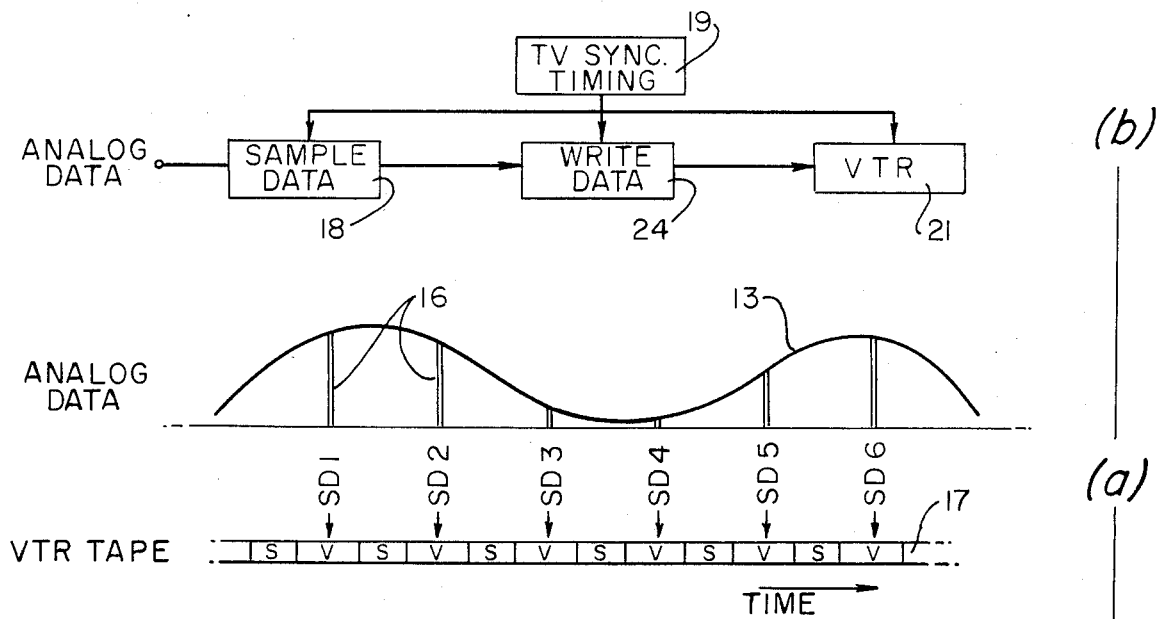
FIG. 3 is a composite diagramatic view illustrating the method of sampling an analog signal and controlling the sampling procedure directly through use of the TV sync pulses.

Although this relationship of sync pulses and a sampled data signal is shown in FIG. 3(a) for only one analog signal this method of sampling and writing data on a video tape 17 can apply to a number of analog signals through multiplexing. Multiplexing between a number of channels involves sequentially sampling each channel in turn until all channels have been sampled. The second sample from the first analog channel is then taken, and the process is repeated for the rest of the channels. The output from the sampling circuitry is a series of sampled analog levels 16, regardless of whether one channel of analog signal is being sampled, or a number of channels are being sampled through multiplexing. As shown diagrammatically in FIG. 3(a), the data samples 16 are written directly on the video interval V of the video tape 17, in a timed or synchronized sequence controlled by the sync pulses S also recorded on the video tape. This control of the data samples extends to control of the taking of the samples through appropriate sampling circuitry 18 (FIG. 3(b)) connected and controlled by the TV sync timing circuitry 19, which also controls or synchronizes the writing of the data on a recording medium through control of the VTR 21.

Figure 4:
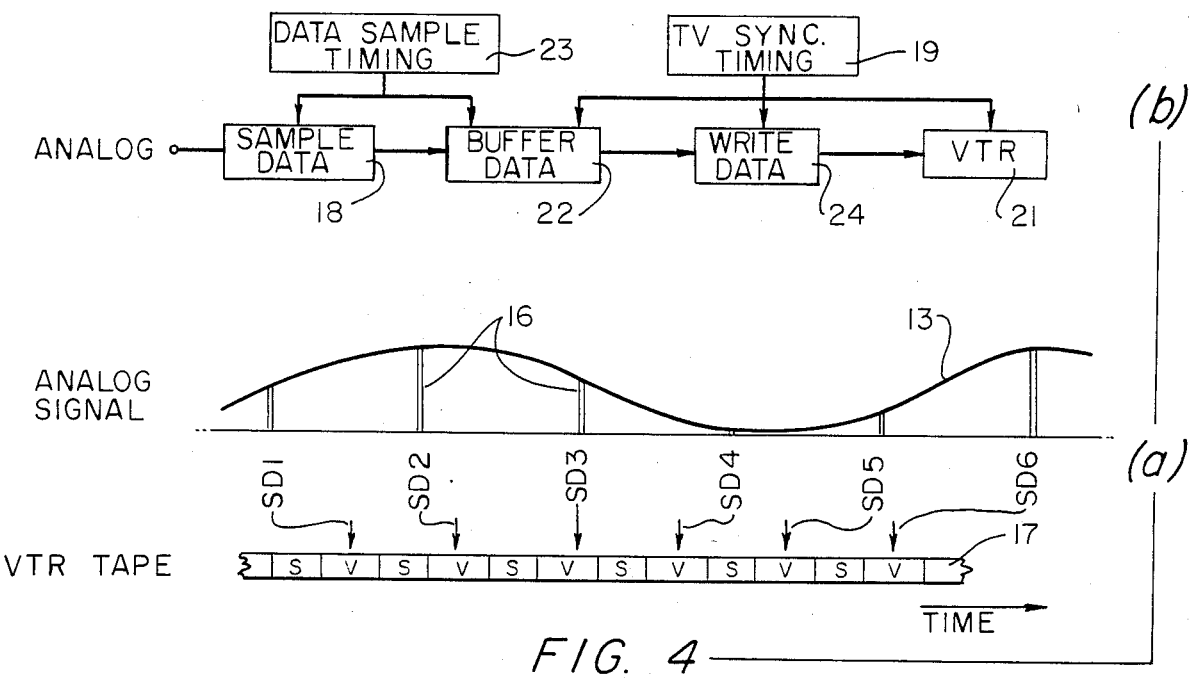
FIG. 4 is a composite diagramatic view illustrating a method of buffering, i.e., storing the analog signal samples to synchronize their recordation with the video data interval of the recording tape.

If the data sampling is not coincident with periods or intervals when the information can be written onto the tape as illustrated in FIG. 4(a), then additional effort must be made to buffer and synchronize the system. FIG. 4(b) outlines in block diagram form how this is carried out. The buffer circuit 22 and data sample timing circuit 23 are added to the circuit shown in FIG. 3(b). The buffer is a temporary storage device where sampled data resides until a video data interval V on tape 17 becomes available. When this occurs, the stored data is removed from the buffer and written onto the tape.

Since the buffer has to receive data from the sampling circuitry and output it through the writing circuitry 24 to the VTR, the buffer has to be able to accept control and timing signals from both the data sample timing circuit 23 and the TV sync timing circuit 19.

Data buffers are in common use today. They exist in a variety of forms. The ones most suited for this particular application are Random Access Memory (RAM), data registers such a First In-First Out (FIFO) registers, and Charge Coupled Devices (CCD).

RAM and storage registers are widely used in digital circuitry. To make use of them in this invention, the sampled analog signal levels are converted to a digital data word (a series of 1's and 0's which numerically encode the value of the sample). This is accomplished with an analog-to-digital (A/D) converter. The digital word is then presented to and loaded in the RAM register. The word will reside in the register until the unloading procedure removes it.

A charge coupled device (CCD) does not require conversion of the analog sample to a digital word. A CCD stores the sample in the same analog voltage form as it was collected. A series of clocking pulses move the sample into and out of the CCD device, thus providing timing controlled storage.

B. Recording the Data Onto Tape

Data can be written on the video tape during the video data periods. The tape is basically a magnetic tape and stores information by varying the intensity of magnetization of the magnetic material contained on the tape. The video picture is stored in this manner, and the variations in tape magnetization are eventually converted into variations of light intensity on each of the horizontal scan lines making up the complete picture on the face of the TV tube.

There are a number of specific techniques which we have discovered can be used to store (write) the sampled analog data onto the tape. These techniques can be used in optional combinations which have various sets of features. These options are presented in a tabular form in Table 1 with the two major dimensions being the data encoding technique and the signal recording technique.

TABLE 1

|  |  | DATS ENCODING TECHNIQUE | | | |
|---|---|---|---|---|---|
|  |  | PAM | PWM | PPM | PCM |
| SIGNAL RECORDING TECHNIQUE | DIRECT CARRIER: | AM FM PHASE (PM) | | | |

Figure 5:
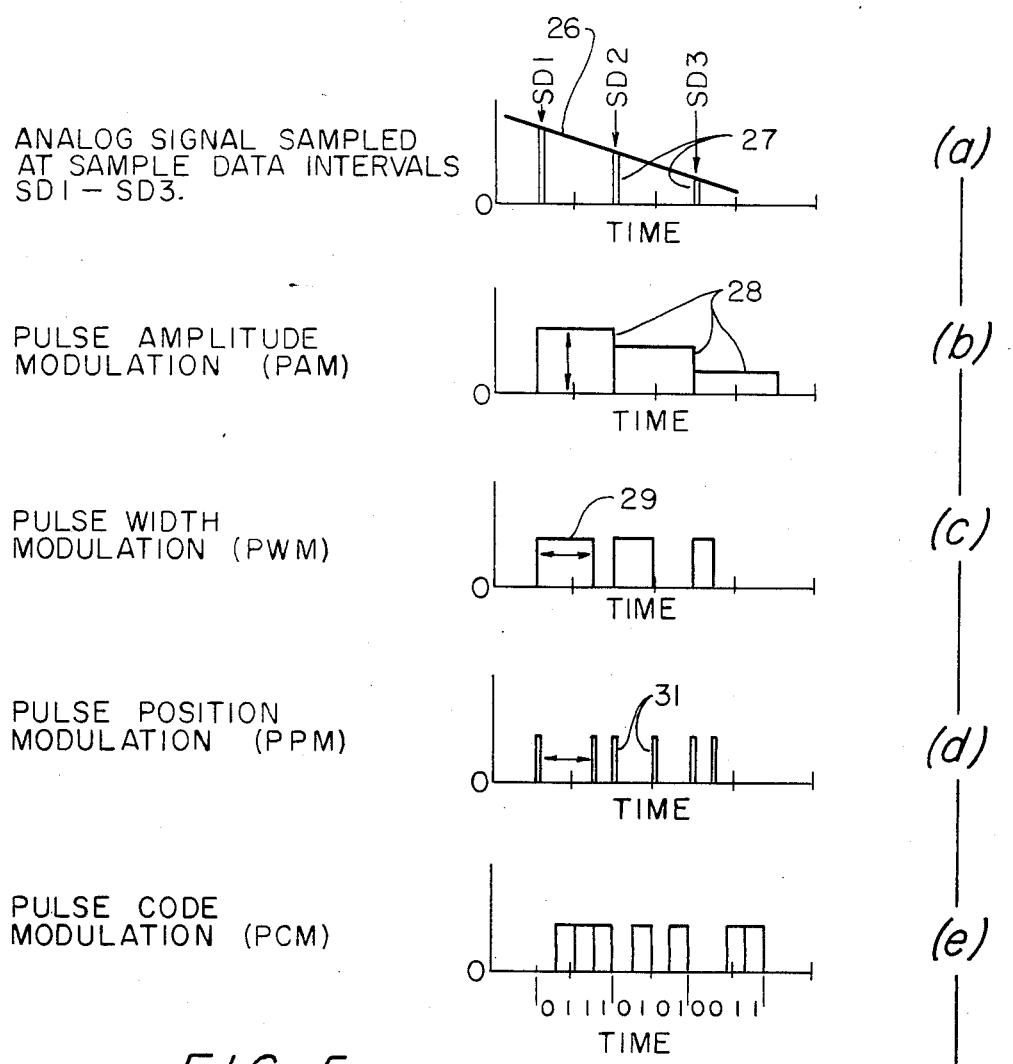
FIG. 5, consisting of (a)-(e), is a composite diagramatic view illustrating various data encoding techniques.

The data encoding techniques include Pulse Amplitude Modulation (PAM), Pulse Width Modulation (PWM), Pulse Position Modulation(PPM), and Pulse Code Modulation (PCM). All of these data encoding techniques are in common use in other applications today. FIG. 5 illustrates the basic operation of these different data signal encoding techniques.

DATA ENCODING TECHNIQUES

The analog signal 26 in FIG. 5(a) is shown as a linear ramp for simplicity of illustration. It is sampled periodically to obtain the successive values 27 of the signal.

In Pulse Amplitude Modulation (PAM), as shown in FIG. 5(b), the sample amplitude is directly transmitted without further encoding. This is a simple procedure but it is subject to interference from electrical noise which will cause variations in the amplitude of the pulses 28.

In FIG. 5(c), Pulse Width Modulation (PWM), the sampled signal is used to control the length of a pulse 29 which is generated for each sample period. Since the amplitude of the PWM pulse 29 is fixed and only carries information as to whether the pulse is on or off, it is less sensitive to noise interference. The sampled signal is, however, now more sensitive to timing variations since the length of the PWM pulse 29 carries the information about the original sampled data amplitude.

Pulse Position Modulation (PPM), as shown in FIG. 5(d), is closely related to PWM. In PPM, the time duration between pulses 31 carries the data amplitude information.

Pulse Code Modulation (PCM), as shown in FIG. 5(e), uses 1's and 0's to encode the data in a digital word. The example in FIG. 5(e) uses a four bit word (four places for the 1's and 0's) to encode each sample. In practice, larger numbers of bits would be used in each digital word to provide greater range and resolution of the sample value being encoded.

PCM encodes data by a pattern of high and low signals (the bits). It is therefore fairly insensitive to noise since it is only necessary to determine if the bit is turned on or off. It is also fairly insensitive to time variations as long as timing errors do not become comparable to the duration of a bit.

SIGNAL RECORDING TECHNIQUES

The signal recording technique refers to how this encoded data is presented to the VTR. This can be done either directly or by means of a modulated carrier wave. Several methods of modulating this carrier are possible.

Figure 6:
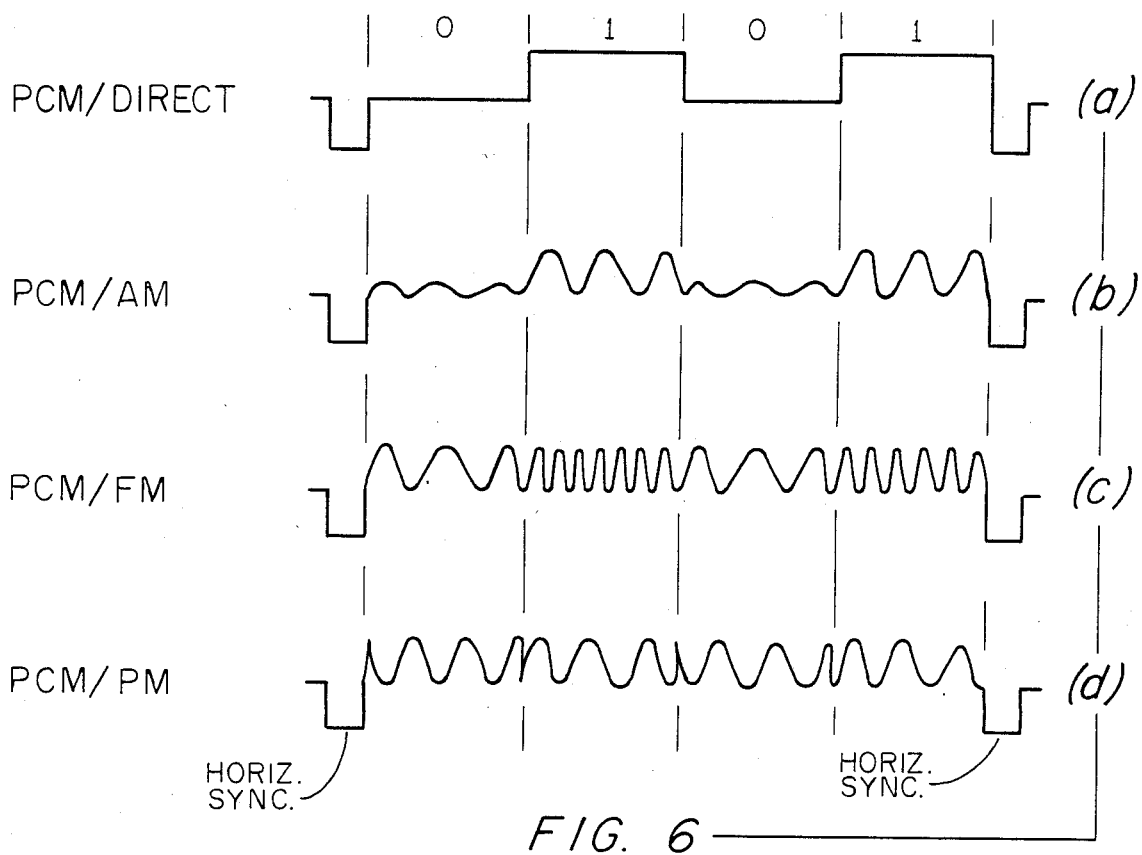
FIG. 6, consisting of (a)-(d), is a composite diagramatic view illustrating the pulse code modulation pulse code 0101 applied to recording techniques shown in Table 1, namely, Direct, AM, FM and PM.

FIG. 6 illustrates a data sample encoded by the Pulse Code Modulation (PCM) technique being applied by different signal recording techniques. In the Direct method shown in FIG. 6(a), the PCM signal is directly presented to the VTR.

In AM (FIG. 6(b)), a carrier signal at a fixed frequency is continuously recorded during the video data period of the VTR recording cycle. The PCM data is used to amplitude modulate this continuous carrier wave.

In FM (FIG. 6(c)), a carrier wave of constant amplitude is recorded. The PCM data is used to change the frequency (frequency modulate) of the carrier in this case.

In Phase Modulation (PM) (FIG. 6(d), the recorded carrier wave possesses both constant frequency and amplitude. The 1's and 0's of the PCM data are used to control the phase of the carrier. In the illustration in FIG. 6(d), the carrier is shown undergoing a complete 180 degree phase reversal between high and low bits. Other values of phase shift could be used.

In FIG. 6, only four bits are shown being recorded on each horizontal line. This is done to simplify the drawing. In practice, a higher number of bits would be used.

There is an important distinction which can be made between the direct and carrier signal recording techniques. Comparison of FIG. 2 and FIG. 6 shows the Direct recording technique would be incompatible with the simultaneous recording of video and any other information. The Direct method requires the signal levels on the VTR to be either completely high or low. Any other signal would occur as noise in the Direct method.

This is not necessarily the case with the carrier signal methods. If the spectrums of the modulated carrier waveforms are analyzed, it is seen they require only a finite bandwidth to satisfactorily convey the information modulated on them. The spectrum available for recording video picture information is, depending on selection of techniques and specific details, usually much larger than the bandwidth required for the modulated carrier. This means that both encoded data and video information can be recorded simultaneously.

Figure 7:
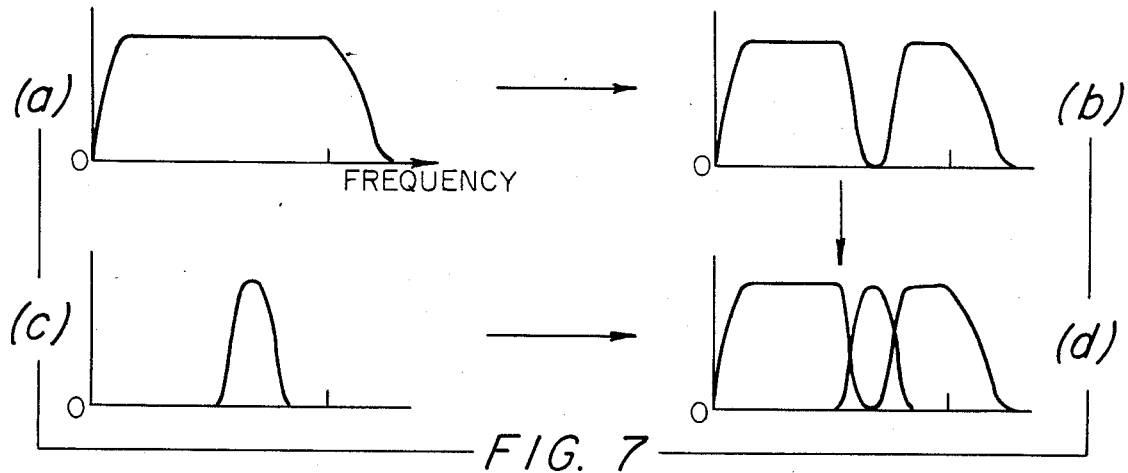
FIG. 7, consising of (a)-(d), is a composite diagramatic view illustrating spectral wave configurations allowing simultaneous recording of video signals and encoded data signals on video tape.

This process is outlined in FIG. 7. FIG. 7(a) shows the signal spectrum occupied by a typical video picture signal. FIG. 7(c) shows a spectrum of a generalized carrier modulated by encloded data. The spectrum of FIG. 7(a) can be modified by bandstop filtering to have a gap located in the frequency band to accommodate the modulated data signal. This is shown in FIG. 7(b). If the modified video spectrum of FIG. 7(b) is combined with the data spectrum of FIG. 7(c), the combined spectrum of FIG. 7(d) results. This combined spectrum has limited interaction (interference) between the video and data signals, and enables their simultaneous recording on the VTR.

Figure 8:
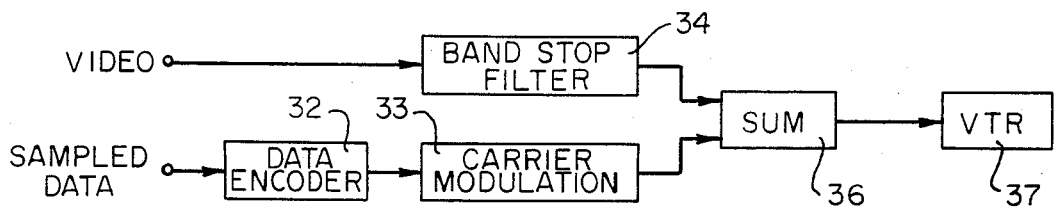
FIG. 8 is a diagrammatic view in block diagram form of a system for co-recording encoded data signals and video signals.

FIGS. 8 and 9 show simplified electronic block diagrams of the electronic states for recording and playback of simultaneous video and data. FIG. 8 illustrates recording, and starts with the video signals (usually from a TV camera) and sampled data. The data goes through a data encoder 32 whose output is then used at 33 to modulate a carrier wave. The video signal goes through a bandstop filter 34 to open a gap in its spectrum (FIG. 7(b)) for the modulated carrier wave FIG. 7(c). The signals are then combined at 36 and recorded on the VTR 37.

FIG. 9 shows the playback mode. The signal from the VTR 37 is taken to both a bandstop filter 38 and a bandpass filter 39. The bandstop filter is used to eliminate the modulated data signal from the video signal which is to be presented to a TV monitor. If the modulated data signal was not filtered out, it would cause interference on the TV picture. With this filtering, the net effect of the whole procedure on the TV picture is the loss of a piece of the spectrum (shown in FIG. 7(b)) from the video signal. This usually results in a small reduction in resolution in the TV image, but in practice is hardly noticeable.

The bandpass filter 39 is used to eliminate the video signal surrounding the modulated carrier. This is desirable to improve the performance of the demodulator 41 which is used to extract the encoded data from the modulated carrier. After demodulation, the signal passes to the data decoder 42 which reverses the data encoding process, and whose output is the original sampled data.

SYSTEM REFINEMENTS

Data Synchronization and Verification

Data synchronization and verification are two refinements which can substantially improve the performance of a tape recording system.

Data synchronization is utilized to precisely locate data on the tape so it can be accurately read back. For example, in the VTR if it is desired to write a 16 bit digital word (PCM) Code) in the 63.5 $\mu$sec long horizontal scan line, then each bit will be slightly less than 4 $\mu$sec long. To accurately recover these bits, it is necessary to know when they are occurring. A timing inaccuracy of 1 $\mu$sec would represent a 25% error in the bit localization, and could adversely affect results. A mechanical system, such as a tape recorder, can usually be expected to produce timing errors, and some measures should be taken to deal with the problem.

In the system described here, as will hereinafter be explained in detail, a crystal controller clock is used to control the reading of bits back from the tape. This clock is reset and resynchronized at the beginning of each digital word in order to assure its continuous synchronization to the data.

The resynchronization is carried out in two steps. First, the horizontal sync pulse is used to prepare circuitry to detect the synchronization bit. This synchronization bit is the first bit in the 16 bit digital word, and occurs immediately after the horizontal sync pulse. This sync bit is always recorded as a "1" on the tape and, during replay, the time interval which should contain it, as indicated by the preceding horizontal sync, is integrated to identify the sync bit. Integrating the time interval enables recovering the sync bit in the face of noise. A comparator circuit is set so that near the end of the time interval occupied by the first bit, the comparator generates a pulse which resets the crystal oscillator which will then accurately control readout of the remaining 15 bits in the word.

Data verification is a procedure to further reduce the chance of inaccurate data being passed through the system. In the system described here, redundant data is transmitted and then checked to ensure accuracy. Each data transmission through the system is repeated so that two identical pieces of data are available, one after the other. These are then compared to determine if they have the same value. If they do not agree, the circuitry controlling the final data output is locked to remain at the last accurate value. If the original sampling rate was high enough, occasionally missing a sample at the data output will not adversely affect the data.

Although all of the procedures discussed have been aimed at recording on a VTR, they are generally applicable to recording on any tape recorder which has sufficient bandwidth. For recorders other than VTR's, the data bandwidth would have to be reduced, resulting in slower sampling rates and the use of pulses with longer rise and fall times. However, this would be acceptable for many applications.

Modern audio tape recorders which have frequency responses up to 18–20 kHz are good candidates for recording data by the methods discussed here. If data only were recorded and the two audio tracks used at once, it would be possible to record 16 channels of analog data with a frequency response from d.c. to 70 kHz.

Also although this discussion has always assumed starting with one or more channels of analog data, it is possible that other types of data could be encountered. Since the system is fully compatible with digital words, it would be reasonable to use the tape recorder to store digital words from a computer.

APPARATUS

The foregoing explains the methods devised by us to accomplish the surprising result of recording instrumentation quality data on video tape through use of an unmodified video tape recorder.

With respect to the means by which these results are obtained, apparatus is illustrated in FIG. 10 for acquiring and recording instrumentation quality data simultaneously with video information. The apparatus is illustrated in block diagram form because each of the component parts is readily available commercially. The surprising thing is that it appears that no one has combined the components in the manner presented to achieve the results disclosed herein.

Figure 11:
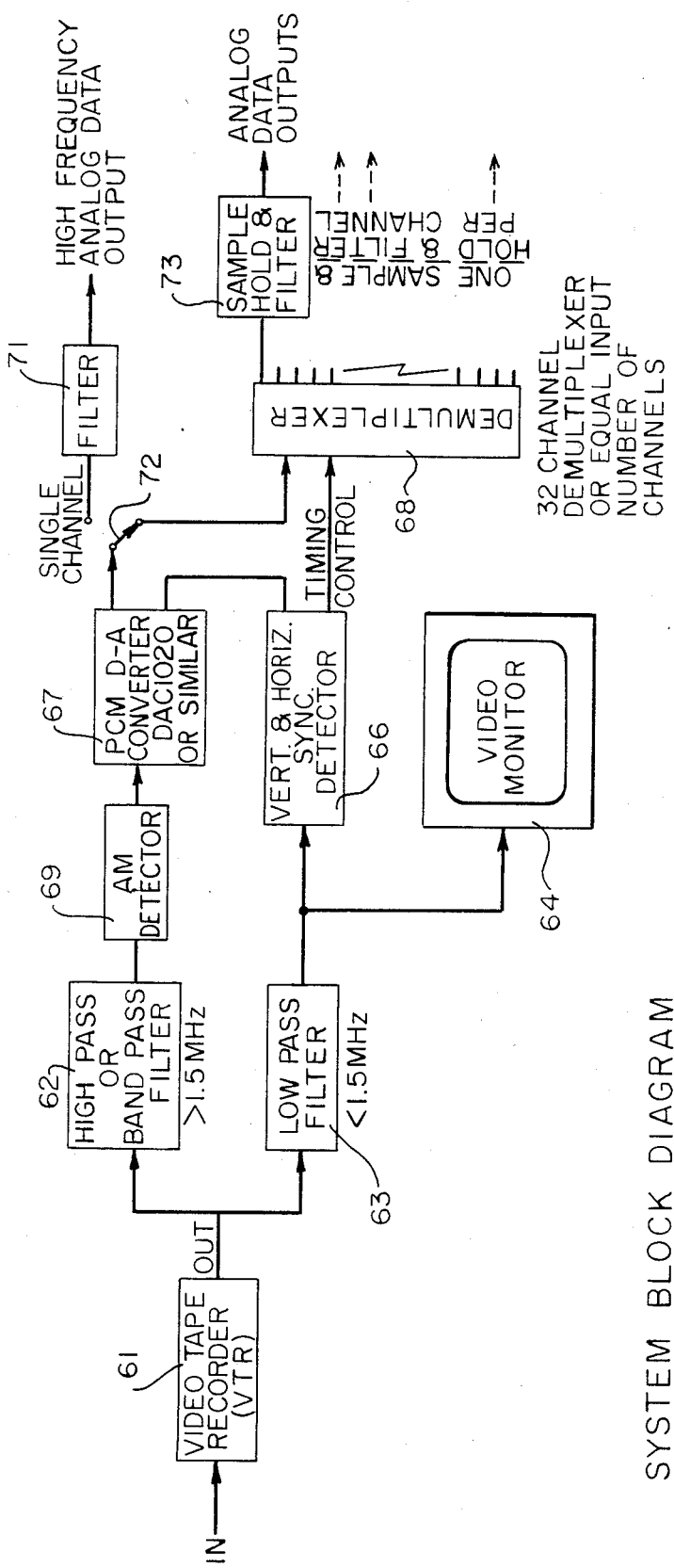
FIG. 11 is a diagrammatic view in block diagram form of a system for playing back data and video signals recorded on an unmodified video tape recorder.

FIG. 11 is a block diagram of the playback circuitry for playing back on an unmodified video tape recorder the previously recorded data according to the methods disclosed above. As with FIG. 10, all of the components illustrated are commercially available and need not be described in detail to permit one skilled in the art to practice the invention.

Referring to FIG. 10, the data acquisition system comprises a multiplexer 41 capable of receiving multiple channels of analog data inputs from various sources. For multiple inputs of analog or digital data, the various inputs are time multiplexed by standard well known techniques that need not be discussed herein. The result of such multiplexing is the creation of a single data line 42. The resultant single channel analog or data line 42 is connected through appropriate switch terminal 43 and switch blade 44 to a sample and hold switch device 46 which forms part of the analog-to-digital A/D converter 47. The block diagram of FIG. 10 illustrates a 32 channel configuration for the multiplexer. It should be understood that more or less channels may be multiplexed. The only limitation is that the greater the number of channels to be multiplexed, the lower the frequency response of each channel, the limitation being that of the well known Shannon sample rate theory.

The scan rate of the standard TV raster with a period of 63.5 $\mu$sec per horizontal sweep is used also as the sample interval for each digital data word. The resultant 15,750 samples per second limits a single channel recording to 7,875 Hz or less. As the number of channels increases, the maximum data frequency of each channel is reduced and, with the 32 channel example shown, the maximum data rate is approximately 250 Hz.

While the foregoing contemplates multiple analog inputs, the system is susceptible to receive a single high frequency analog input signal. For this alternative input method, a switch terminal 48 is provided adjacent switch terminal 43 to accommodate switching of the switch blade 44 to the terminal 48 to receive such single high frequency analog signal.

Once a single analog data line is obtained either from the single high frequency input terminal 48 or from the multiplexer through data channel 42, the signal is converted into digital form by the A/D converter 47. As a standard part of the converter, the sample and hold switch 46 provides a constant input during the digital conversion process. The parallel output of the A/D converter is connected to a serial pulse code modulated (PCM) data stream 51 by interposition of a parallel-to-serial shift register 52. If per chance some digital as well as analog signals must be accommodated, then these can be inserted into the PCM data stream by proper multiplexing.

Also included in this data acquisition circuit is a master clock and timing control device 53 which is also an off-the-shelf item commercially available. This timing control device 53 has multiple signal output terminals, appropriately connected as a timing control to the multiplexer 41, sample and hold switch 46, and A/D converter as shown. Additionally, the device 53 provides a synchronizing signal through channel 54 to the TV camera 56.

While it has been indicated above that the pulse code modulated data signal may be written directly on the recording tape, it is preferable to provide a carrier signal of appropriate frequency, say in the range of 1.5 MHz to 1.8 MHz from a source 57. The carrier signal and the PCM serial data stream are fed into a modulator 58, where the PCM data signal is encoded on the carrier signal by appropriate modulation of the carrier signal as previously discussed. It is desirable to select the frequency of the carrier signal as high as possible so as to cause the least interference to the video picture, but at the same time the frequency response of the tape recorder appears to fall off rapidly above about 1.8 MHz. It is for this reason that a carrier signal frequency ranging between 1.5 MHz and 1.8 MHz has been selected. With improvement in the frequency response of tape recorders, the carrier frequency may be increased without detrimental effects on the digital data and thereby further improve the video quality.

The modulated carrier signal and TV signal are now input into a mixer 59 whose function is to mix the data carrier frequency with the video signal in a manner that causes minimum interference to the video picture. Since the camera 56, A/D converter 47 including the sample-hold switch 46 and multiplexer are all controlled from the one master clock and timing control circuit 53, the composite video and data signal that emanates from the mixer is now a properly synchronized single signal suitable for remote transmission and/or recording on the video tape recorder 61.

While the discussion above explains the method and means for recording instrumentation quality data alone, or a composite of instrumentation quality data and video signals on a magnetic medium, such as a video tape, utilizing an unmodified commercially available video tape recorder, the usefulness of the foregoing method and means is enhanced by the provision of method and means for utilizing the recorded medium by extracting from the tape the information recorded thereon. The circuit illustrated in FIG. 11 operates to facilitate this procedure.

Referring to FIG. 11, the commercially available unmodified video tape recorder 61 is loaded with the recorded video tape. When energized to play back the signals impressed on the tape, the output of the VTR must be processed to obtain the video picture and the individual analog outputs. A high pass filter or bandpass filter 62 is used to extract the higher frequency data carrier (>1.5 MHz), while the frequency video signal (<1.5 MHz) is passed through a low pass filter 63 to reduce to a minimum the interference of the video picture by the higher frequency data carrier. The video signal can be displayed on a standard video monitor 64.

Also extracted from the video signal by a vertical and horizontal sync detector 66 are the standard vertical and horizontal sync signals which are applied to synchronize the digital to analog (D to A) converter 67 and the demultiplexer 68. The PCM data signal that is riding on a 1.5 MHz carrier must be converted back to standard digital 1's and 0's before application of the signal to the D to A converter. The specific circuit 69 used to obtain the (AM) 1's and 0's will depend upon the modulation used to encode the PCM signal on the carrier signal. The D to A converter is a DAC 1020 or similar commercially available integrated circuit device. The output of the D to A converter goes to a filter 71 through a switch 72 if the single high frequency configuration is being used, or to the demultiplexer 68 if the input has been multiplexed. After demultiplexing, each output goes to a sample and hold amplifier and smoothing filter 73 as shown.

Having thus described the invention, what is believed to be new and novel and sought to be protected by letters patent of the United States is claimed as follows:

1. In a data acquisition and recording system for receiving and recording analog data through use of a conventional unmodified video tape recorder utilizing conventional video recording tape for recording data thereon other than video information but utilizing the standard video composite waveform standard which includes video information recording tracks extending transversely across the video tape and spaced longitudinally therealong and vertical and horizontal synchronizing pulse recording tracks extending longitudinally therealong, the combination comprising:

(a) analog data input terminal means adapted to selectively receive a single high frequency data signal or a multiplicity of time multiplexed data signals;

(b) means including an analog-to-digital converter connected to receive an analog signal from said analog data input terminal and converting the analog signal to a pulse code modulated digital form;

(c) a parallel-to-serial shift register having input terminals, one input terminal being connected to said analog-to-digital converter to receive the pulse code modulated signal therefrom;

(d) pulse-timing control means having multiple output terminals selectively connected to said analog data input terminal means, to said analog-to-digital converter and to said shift register and operative to provide a constant input during the analog-to-digital conversion process to provide synchronization of the pulse code modulated data stream emanating from said parallel-to-serial shift register with the timing of the vertical and horizontal sync pulses of said video tape recording waveform standard;

(e) a carrier frequency signal source terminal (f) a modulator for receiving said pulse code modulated data stream signal from said parallel-to-serial shift register and said carrier frequency signal and operative to modulate said carrier frequency in correlation to said pulse code modulated data signal to produce a modulated output signal;

(g) a conventional video camera connected to said timing means whereby said camera is operated in synchronism with the pulse code modulated data stream emanating from said parallel-to-serial shift register, said video camera having a signal output terminal;

(h) a mixer connected to receive said modulated output signal from said modulator and to receive said output signal from said video camera and operative to mix the signals to produce one composite signal suitable for recording on a conventional video tape recorder; and (i) a conventional video tape recorder adapted to receive said composite signal from said mixer to effect recordation thereof on said transversely extending longitudinally spaced recording tracks.

2. The combination according to claim 1, in which said carrier signal has a frequency ranging between 1.5 MHz and 1.8 MHz.

3. The data acquisition and recording system according to claim 1, in which buffer means are provided interposed between said analog data input terminal means and said analog-to-digital converter operative to temporarily hold said analog data signal and release it to said analog-to-digital converter in response to said pulse-timing control means whereby said analog data is recored on said video tape in synchronize with the vertical and horizontal sync pulses of said video tape recording waveform standard.

* * * * *